(No Model.) 3 Sheets—Sheet 1.

W. S. SIMS.
SPEED REGULATOR FOR PULLEYS.

No. 433,660. Patented Aug. 5, 1890.

WITNESSES
H. L. Gill.
Thomas W. Bakewell.

INVENTOR
William S. Sims (No Model.) 3 Sheets—Sheet 3.

W. S. SIMS.
SPEED REGULATOR FOR PULLEYS.

No. 433,660. Patented Aug. 5, 1890.

WITNESSES
INVENTOR

UNITED STATES PATENT OFFICE.

WILLIAM S. SIMS, OF PITTSBURG, PENNSYLVANIA.

SPEED-REGULATOR FOR PULLEYS.

SPECIFICATION forming part of Letters Patent No. 433,660, dated August 5, 1890.

Application filed June 12, 1890. Serial No. 355,145. (No model.)

*To all whom it may concern:*

Be it known that I, WILLIAM S. SIMS, of Pittsburg, in the county of Allegheny and State of Pennsylvania, have invented a new and useful Improvement in Speed-Regulators for Pulleys, of which the following is a full, clear, and exact description.

In the use of conical belt-pulleys for regulating the speed of driving-belts it is an observed fact that the belt tends of itself to shift on the pulleys toward the larger ends of the latter, and although many appliances have been devised for the purposes of preventing this and for keeping the belt in the position in which it may be set on the pulleys, none of such contrivances has heretofore been satisfactory.

My invention consists in using, in combination with such pulleys, guide-pulleys set in contact with the belt and of tapering or conical shape, the taper, however, being in a reverse direction to the taper of the respective belt-pulleys. The effect of the use of such guide-pulleys is to exert on the belt a tendency to lateral motion in the opposite direction to that exerted by the belt-pulleys, and to counteract the influence of the latter so that no difficulty is experienced in preserving the constant position of the belt in relation to the driving-pulleys.

I shall now describe my invention so that others skilled in the art may construct and apply the same to use, reference being had to the accompanying drawings, forming part of this specification, in which—

Figure 1:
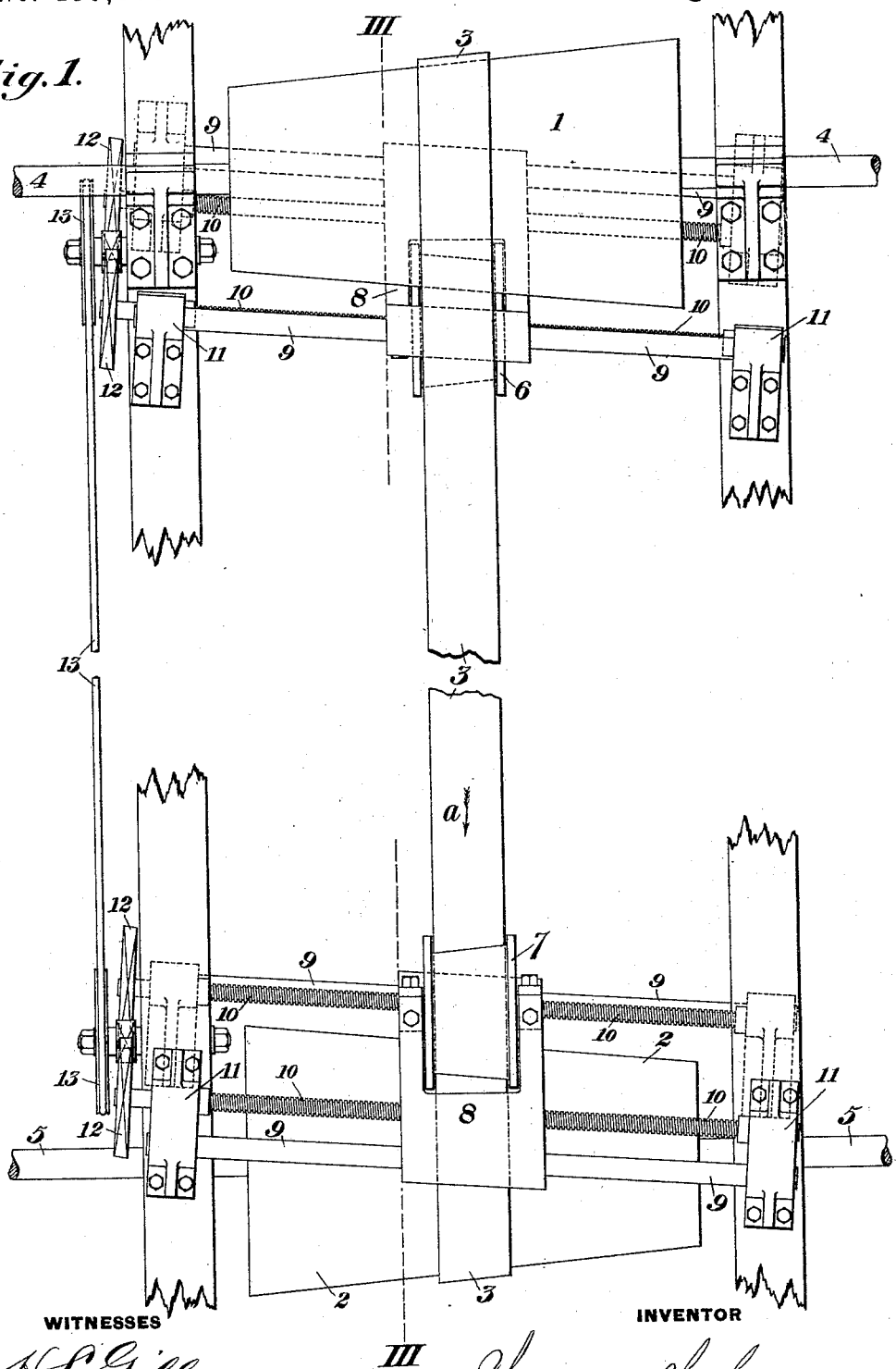
Figure 2:
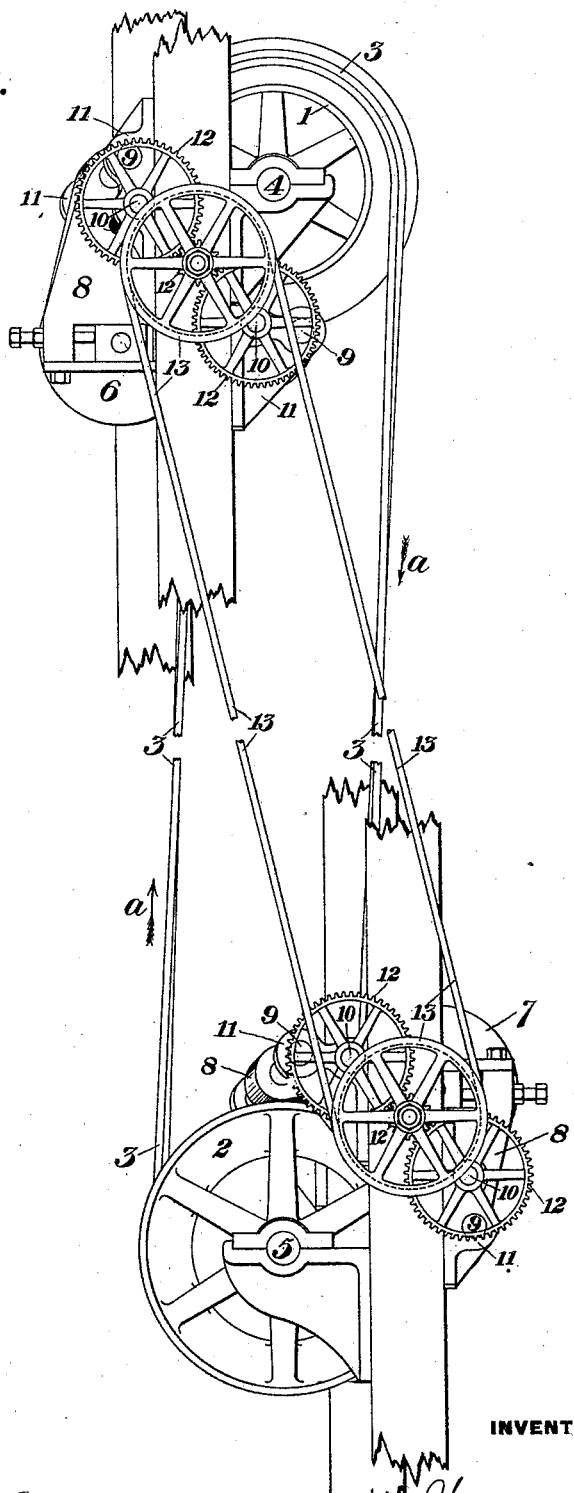
Figure 3:
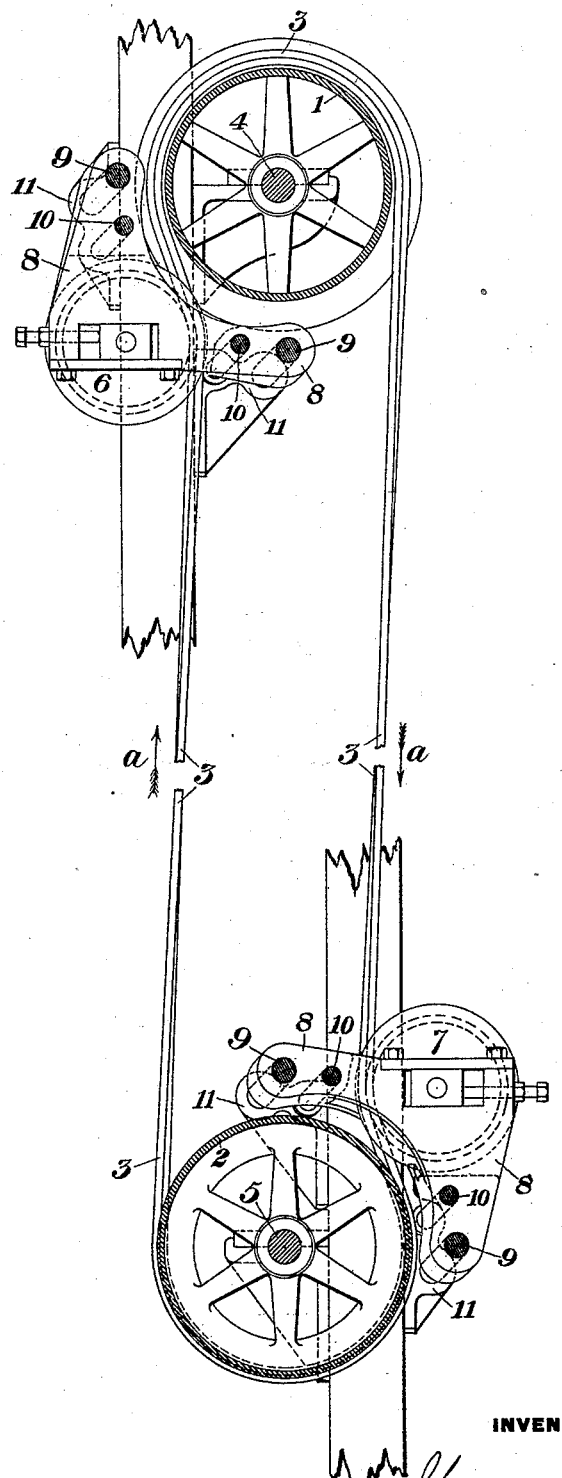

Figure 1 is a front elevation of my improved apparatus. Fig. 2 is a side elevation thereof. Fig. 3 is a vertical longitudinal section on the line III III of Fig. 1.

Like symbols of reference indicate like parts in each.

In the drawings, 1 and 2 represent the conical driving-pulleys.

3 is the belt which moves in the direction of the arrows *a* to transmit motion from one pulley to the other, and which, by being shifted laterally on the pulleys, can be made to transmit motion of variable speed, as will be readily understood.

4 and 5 are the usual shafts on which the pulleys are mounted.

6 and 7 are the guide-pulleys, which are situate adjacently to the respective driving-pulleys, and are formed of conical shape. The taper of each of the guide-pulleys is in a direction opposite to the taper of the driving-pulley with which it co-operates. Each guide-pulley is journaled in a carriage or frame 8, which is supported by guide-rods 9, on which the carriage is loosely set so as to be capable of lateral motion, and by screw-shafts 10, which pass through female screws in the carriages and are journaled at their ends in bearings 11. The rods 9 and the screw-shafts 10 are parallel to the longitudinal line on the periphery of the driving-pulley, which is intersected by a plane connecting the axis of rotation of the driving-pulley and guide-pulley. The screw-shafts 10 of each carriage are connected by gearing 12 and belt-connection 13. The guide-pulleys are situate on the receiving sides of the respective driving-pulleys, and are made adjustable in their bearings, as shown in Fig. 3, so that they may be caused to press firmly against the belt.

The operation of the device will be readily understood. As the driving-pulleys rotate, the belt is moved in the direction of the arrows, and although the bearing of the belt against the tapering peripheries of the driving-pulleys tends to move the belt laterally toward the higher ends of the latter, this tendency is counteracted and neutralized by the tendency of the belt to move laterally in the opposite direction toward the higher ends of the guide-pulleys 6 and 7. When it is desired to shift the belt on the driving-pulleys for the purpose of varying the speed of motion transmitted by the apparatus, this is done by rotation of the gearing 12 by the belt-connection 13, the effect of which is to rotate the screw-shafts 10, and through these screw-shafts to move the carriages with the guide-pulleys in a lateral direction, thus shifting the belt.

The advantages of my invention will be appreciated by those skilled in the art. It is simple in its construction, is very durable, and efficient in its operation.

It will be understood by the skilled mechanic that the apparatus is susceptible of modification in divers ways.

I claim as my invention—

1. The combination, with the tapering driving-pulley and belt, of a guide-pulley tapered in a direction contrary to the taper of the driving-pulley, substantially as and for the purposes described.

2. The combination, with the tapering driving-pulley and belt, of a guide-pulley tapered in a direction contrary to the taper of the driving-pulley, said guide-pulley being laterally movable and situate on the receiving side of the driving-pulley, substantially as and for the purposes described.

3. The combination, with the tapering driving-pulleys and a belt connecting the same, of laterally-movable guide-pulleys situate adjacently to the respective driving-pulleys, and each being tapered in a direction contrary to the taper of such driving-pulley, substantially as and for the purposes described.

In testimony whereof I have hereunto set my hand this 12th day of March, A. D. 1890.

WILLIAM S. SIMS.

Witnesses:
W. B. CORWIN,
H. M. CORWIN.